US012772063B2

(12) United States Patent
Eichholz et al.

(10) Patent No.: US 12,772,063 B2
(45) Date of Patent: Oct. 20, 2026

(54) METHOD FOR MANAGING AN APPLICATION FOR ELECTRONIC IDENTIFICATION OF A USER

(71) Applicant: GIESECKE+DEVRIENT MOBILE SECURITY GERMANY GMBH, Munich (DE)

(72) Inventors: Jan Eichholz, Munich (DE); Michael Edwards, Berlin (DE)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 19 days.

(21) Appl. No.: 18/848,629

(22) PCT Filed: Mar. 28, 2023

(86) PCT No.: PCT/EP2023/025138

§ 371 (c)(1),
(2) Date: Sep. 19, 2024

(87) PCT Pub. No.: WO2023/186348

PCT Pub. Date: Oct. 5, 2023

(65) Prior Publication Data

US 2025/0203377 A1 Jun. 19, 2025

(30) Foreign Application Priority Data

Mar. 30, 2022 (DE) ..................... 10 2022 001 094.1

(51) Int. Cl.

| | |
|---|---|
| ***H04W 12/72*** | (2021.01) |
| ***H04L 9/08*** | (2006.01) |
| ***H04W 8/20*** | (2009.01) |
| ***H04W 12/37*** | (2021.01) |

(52) U.S. Cl.

CPC ........... *H04W 12/72* (2021.01); *H04L 9/0825* (2013.01); *H04L 9/0866* (2013.01); *H04W 8/20* (2013.01); *H04W 12/37* (2021.01)

(58) Field of Classification Search

CPC ..... H04W 12/02; H04W 12/04; H04W 12/35; H04W 12/37; H04W 12/72; H04W 8/20; H04L 9/08; H04L 9/0825; H04L 9/0866

(Continued)

(56) References Cited

U.S. PATENT DOCUMENTS 9,301,145 B2 * 3/2016 Merrien .................. H04W 4/70
10,439,823 B2 * 10/2019 Park ...................... H04L 9/3066

(Continued)

FOREIGN PATENT DOCUMENTS

DE 102016000324 A1 7/2017
DE 102019100335 A1 7/2020
EP 3930361 A1 12/2021

OTHER PUBLICATIONS

International Search Report from corresponding PCT Application No. PCT/EP2023/025138, Jul. 17, 2023.

(Continued)

*Primary Examiner* — James N Fiorillo
(74) *Attorney, Agent, or Firm* — Workman Nydegger

(57) ABSTRACT

A method for managing an application for the electronic identification of a user of a mobile terminal has a subscriber identity module in a mobile network. The method comprises: transmitting a request to generate a subscription profile, with the application, to a subscription manager data preparation (SM-DP+) server of the mobile network; generating a subscription profile with the application for the electronic identification of the user, wherein generating the subscription profile comprises generating a private asymmetric personalization key associated with the subscription (Continued)

profile and a public asymmetric personalization key associated with the subscription profile for the application; transmitting the public asymmetric personalization key to a server of the mobile network operator or to a server of an identification provider; encrypting identity data of the user using the public asymmetric personalization key; and distributing the subscription profile with the application, and the private asymmetric personalization key to the mobile terminal.

13 Claims, 4 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 10,530,756 | B1 * | 1/2020 | Youngs | G06F 16/23 |
| 12,457,104 | B2 * | 10/2025 | Eckardt | H04W 8/205 |
| 12,470,554 | B2 * | 11/2025 | Dirnberger | H04L 63/0853 |
| 2016/0269386 | A1 * | 9/2016 | Nix | H04B 1/3816 |
| 2016/0277930 | A1 * | 9/2016 | Li | H04L 41/28 |
| 2017/0180349 | A1 * | 6/2017 | Park | H04L 63/20 |
| 2018/0098213 | A1 * | 4/2018 | Caceres | H04L 63/1458 |
| 2018/0123803 | A1 * | 5/2018 | Park | H04L 9/14 |
| 2018/0219681 | A1 * | 8/2018 | Geiman | H04L 9/3231 |
| 2018/0375649 | A1 * | 12/2018 | Goller | H04L 63/0853 |
| 2020/0120494 | A1 * | 4/2020 | Fares | H04W 12/35 |
| 2020/0128393 | A1 * | 4/2020 | Wane | G06F 21/64 |
| 2021/0342462 | A1 * | 11/2021 | Nix | H04W 12/04 |
| 2021/0392488 | A1 * | 12/2021 | Barry | H04W 12/35 |
| 2022/0116230 | A1 * | 4/2022 | Dietrich | H04L 9/006 |
| 2024/0275593 | A1 * | 8/2024 | Salmela | H04L 9/14 |
| 2025/0112901 | A1 * | 4/2025 | Arora | H04L 9/14 |
| 2025/0310777 | A1 * | 10/2025 | Baskaran | H04W 12/35 |

OTHER PUBLICATIONS

German Search Report from corresponding DE Application No. 102022001094.1, Feb. 7, 2023.

* cited by examiner

METHOD FOR MANAGING AN APPLICATION FOR ELECTRONIC IDENTIFICATION OF A USER

TECHNICAL FIELD OF THE INVENTION

The invention relates to a method for managing an application for the electronic identification of a user of a mobile terminal having a subscriber identity module in a mobile network.

To use services of a communication network, a terminal, for example a mobile telephone or a machine-to-machine device, M2M device for short, or a device for using Internet of Things technologies, IoT for short, contains a subscriber identity module. The term "subscriber identity module" is used synonymously in this description with the terms "UICC", "eUICC", "chip card", "iUICC", "integrated eUICC", "integrated secure element", "embedded secure element", "secure element" or "SIM". The subscriber identity module generally comprises one or more subscription profiles, which are configured to authenticate the subscriber identity module or a device in which the subscriber identity module is operated, such as for example a mobile terminal, with the mobile network.

The electronic identification application may be designed for example as a computer program, in particular as an applet. Electronic identification denotes a digital proof of identify for citizens or organizations. Electronic identification is also referred to as eID. Electronic identification may comprise, inter alia, an eID registration number, a surname, a forename, a date of birth, a gender, a place of birth, a nationality and/or a facial image of the person to be identified. In the present method, the person to be identified corresponds to the user of the terminal.

US20210342462 A1 discloses a subscriber identity module having an embedded universal integrated circuit card, which receives and decrypts an encrypted profile and which is configured to generate random numbers using memory noise in order to derive private and public keys therefrom, these then being stored securely on the card.

TECHNICAL BACKGROUND

When a user of a terminal enters into a mobile phone contract, identity data of the user are generally collected by the mobile network operator (MNO) or by an identification service commissioned by the mobile network operator. The identity data of the user are available to the mobile network operator (MNO) or the identification service at the time of collection of the data.

There is a need for governments to provide their users easily and securely with an application for the electronic identification of the user, such as for example an eID applet, which is able to be executed in particular on the terminal of the user. The data for the application should be provided using the identity data available to the mobile network operator or the identification service. Such an eID applet may serve as an electronic identity document.

SUMMARY OF THE INVENTION

The invention is based on the object of providing a method by way of which it is possible, easily and securely, to provide an application for the electronic identification of the user.

Another object of the present invention is to provide the user with a simple and data protection-compliant option for personalizing the application.

The method according to the invention for managing an application for the electronic identification of a user of a mobile terminal having a subscriber identity module in a mobile network comprises the following method steps:

- transmitting a request to generate a subscription profile, with the application for the electronic identification of the user, to a subscription manager data preparation (SM-DP+) server of the mobile network;
- generating a subscription profile with the application for the electronic identification of the user, wherein generating the subscription profile comprises generating a private asymmetric personalization key associated with the subscription profile and a public asymmetric personalization key associated with the subscription profile for the application for the electronic identification of the user;
- transmitting the public asymmetric personalization key to a server of the mobile network operator (MNO) or to a server of an identification provider;
- encrypting identity data of the user using the public asymmetric personalization key;
- distributing the subscription profile with the application for the electronic identification of the user, and the private asymmetric personalization key to the mobile terminal; and
- a subscription manager data preparation (SM-DP+) server of the mobile network or a trusted service distributing the application for the electronic identification of the user to the mobile terminal (2).

A subscription profile is a memory area allocated in the subscriber identity module (container, slot). The subscription profile stores, inter alia, subscription data (authorization data, network access data, network access credential data, credentials) that allow a user (subscriber) to use services such as voice and/or data services of a mobile network. The use of these services is enabled following successful logging into the mobile network.

In order to log into a mobile network, subscription data of a subscription profile are used to uniquely identify and/or authenticate a user (subscriber) of a terminal in which the subscriber identity module is inserted ready for operation on the mobile network.

The subscription manager may be a root issuer security domain (ISD-R). It is particularly preferable here for the subscription manager to be a root issuer security domain (ISD-R) according to the GSM specification SGP.22, in particular according to Version 2.3 of the GSM specification SGP.22 of 30 Jun. 2021.

Such an application for the electronic identification of the user may for example be part of the subscription profile.

The subscription manager data preparation (SM-DP+) server may in particular be a subscription manager data preparation (SM-DP+) server according to the GSM specification SGP.22, in particular according to Version 2.3 of the GSM specification SGP.22 of 30 Jun. 2021.

By way of example, the subscriber identity module has a file system as described in 3GPP TS 11.11 or 3GPP TS 11.14. The file system contains files, for example elementary files, EF. An EF contains header data and main data and exists in three forms: transparent EF, linear fixed EF and cyclic EF. By way of example, the file system of the subscriber identity module comprises dedicated files, DF, which contain header data with a hierarchical structure of elementary files, EF, on the subscriber identity module. DFs do not have their own data. A DF may be thought of as a directory structure. The file system of the subscriber identity module has at least one master file, MF, and represents the root file in the UICC file system.

A subscriber identity module within the context of the invention is for example an electronic module that is reduced in terms of size and scope of resources and that has a control unit (microcontroller) and at least one interface (data interface) for communication with the device. This communication preferably takes place via a connection protocol, in particular a protocol according to the ETSI TS 102 221 or ISO-7816 standard.

In the case of subscriber identity module designs implemented as an integrated system on a chip, or system on chip as it is known, SoC for short, such as the "iUICC", the "integrated eUICC", the plug-in eUICC, the "integrated SE" or the "integrated TRE", communication takes place via a bus internal to the SoC. The subscriber identity module has an internal or external secure non-volatile memory area in which subscriber identity data and authentication data are securely introduced in order to prevent attempted manipulation and/or misuse during identification and/or authentication on the network.

In one embodiment, the subscriber identity module may be operable by way of a device, wherein the subscriber identity module, in this embodiment, is autonomous except for supply signals, such as supply voltage, clock cycle, reset, etc.

The term subscriber identity module is synonymous with the term "UICC", "eUICC", "chip card", "iUICC", "integrated eUICC", "integrated secure element", "embedded secure element", "secure element" or "SIM". The UICC is for example a chip card or a SIM card or a subscriber identity module. The subscriber identity module serves to use the machine-readable subscriber identity data stored in the secure non-volatile memory area to identify a subscriber in a communication network and to authenticate them for the use of services. A subscriber identity module should also be understood to mean a USIM, TSIM, ISIM, CSIM or R-UIM. By way of example, a UICC is thus defined as a USIM application in ETSI TS 131 102. By way of example, a UICC is thus defined as a SIM application in ETSI TS 151 011. By way of example, a UICC is thus defined as a TSIM application according to ETSI TS 100 812. By way of example, a UICC is thus defined as an ISIM application according to ETSI TS 131 103. By way of example, a UICC is thus defined as a CSIM application according to 3GPP2 C.S0065-B. By way of example, a UICC is thus defined as an R-UIM application according to 3GPP2 C.S0023-D.

The subscriber identity module may be an integral component within the device, for example a hard-wired electronic module. Such subscriber identity modules are also referred to as eUICCs. In this design, these subscriber identity modules are not intended to be removed from the device, and cannot be easily replaced in principle. Such subscriber identity modules may also be designed as embedded secure elements, and are a secure hardware component in the device.

The subscriber identity module may also be a software component in a trusted part of an operating system, what is known as a trusted execution environment, TEE for short, of the device. By way of example, the subscriber identity module is formed within a secure runtime environment in the form of programs running therein, what are known as "trustlets".

The subscriber identity module may also be an integral part of a larger integrated circuit, for example of a modem or application processor. Such UICCs are referred to as "integrated UICC", "integrated TRE", "integrated eUICC" or "integrated SE". Such UICCs are fixedly integrated into an SoC as an integrated processor block and are able to be connected via a bus internal to the chip.

The subscriber identity module may be used for remote monitoring, inspection and maintenance of devices such as machines, installations and systems. It may be used for metering units such as electricity meters, hot water meters, etc. The subscriber identity module is for example part of IoT technology.

The term "terminal" is preferably used here, wherein the terminal may primarily be a "terminal" in communication technology. This does not rule out a "terminal" possibly being a "device" in another technology. The terms "terminal" and "device" are used synonymously.

A terminal, within the meaning of the invention, is in principle a device or a device component having means for communication with a communication network in order to be able to use services of the communication network or to be able to use services of a server via a gateway of the communication network. By way of example, the term encompasses a mobile device such as a smartphone, a tablet PC, a notebook or a PDA. A device may also be understood to mean multimedia devices such as digital picture frames, audio devices, televisions or e-book readers, which likewise have means for communication with the communication network.

In particular, the device is installed in a machine, an automaton and/or a vehicle. If the device is installed in a motor vehicle, it typically has an integrated UICC as a subscriber identity module. The UICC may set up a data connection to a server via the communication network via the device, for example by way of a modem of the device. By way of example, the device may be used to contact a server of the device manufacturer in order to address control units, for example ECUs (ECU=electronic control unit) for functionalities of the device. The UICC may be used to contact a server in the background system of the mobile network operator, MNO, for example a server for loading updates for software, firmware or/and the operating system of the UICC into the UICC.

A command here is an instruction or an order transmitted by the device. The command is preferably a command according to the ETSI TS 102 221 or ISO/IEC 7816 standard. It may in this case have a command header and a command body.

The subscriber identity module preferably comprises an operating system that is stored executably in the data memory and is configured to perform the steps of the control unit.

By way of example, the subscriber identity module is configured to set up a logical data connection to a server of the mobile network in order to use services of the server or of another server and exchange data. When setting up such a data connection from a subscriber identity module to a server, connection parameters, for example a unique server address and the data connection protocol to be used, are required. By way of example, a card application toolkit, CAT for short, of the subscriber identity module according to the ETSI standard TS 102 223 is used to set up, terminate and operate a data connection.

A mobile network is a technical facility on which signals are transmitted so as to identify and/or authenticate the subscriber. The mobile network provides its own services (its own voice and data services) and/or allows the use of services from external instances. Device-to-device communication under the supervision of the mobile network is possible here. In particular, here, a mobile network, for example the "Global System for Mobile Communications", GSM for short, is understood to be a representative of the second generation, or the "General Packet Radio Service", GPRS for short, or "Universal Mobile Telecommunications System", UMTS for short, is understood to be a representative of the third generation, the "Long Term Evolution", LTE for short, is understood to be a representative of the fourth generation as mobile network, or a 5th generation mobile network with the current working title "5G" is understood to be a communication network. Communication in the communication network may take place via a secure channel, for example as defined in the technical standards ETSI TS 102 225 and/or ETSI TS 102 226, for example SCP80, SCP81 or a transport layer security, TLS.

A server may be an instance spatially remote from the terminal. The server may be part of the mobile network. As an alternative or in addition, the server is an external instance (that is to say not an instance of the mobile network). The subscription manager data preparation (SM-DP+) server may be an instance that is spatially remote from the terminal and that is part of the mobile network.

Subscriber identity data (=subscription data), as are stored for example in the non-volatile memory area of the subscriber identity module, are for example data that uniquely identify a subscriber (a person or a device) in the mobile network. These include for example a subscriber identifier, for example international mobile subscriber identity, IMSI for short, or subscription permanent identifier, SUPI, and/or subscriber-specific data. The IMSI/SUPI is the unique subscriber identity file in a mobile communications network. In addition, subscriber identity data are for example parameters and/or data that allow a subscriber to be able to authenticate themselves uniquely on the communication network, for example an authentication algorithm, specific algorithm parameters, a cryptographic authentication key Ki and/or a cryptographic over-the-air, OTA for short, key. In addition, subscriber identity data are for example data that uniquely authenticate a subscriber to a service, for example a unique identifier or signature. A service is in particular a voice service or a data service of a server by way of which information and/or data are transmitted over the communication network.

The subscriber identity module may be inserted into the terminal ready for operation. Communication between the subscriber identity module and the terminal is based on a connection protocol. In addition, the terminal may additionally also be configured to independently set up a data connection to the spatially remote server in order likewise to use its services and exchange data with this server.

According to one preferred embodiment of the method, the public asymmetric personalization key and the private asymmetric personalization key are generated by way of a hardware security module, HSM.

Preferably, after the identity data of the user have been encrypted, the encrypted identity data are stored on a server. This server is preferably a server different from the SM-DP+ server.

According to one preferred embodiment, a reference to the encrypted identity data, in particular to the encrypted identity data stored on the server, is transmitted to the user in the form of a URL or a QR code. Such a reference may also be referred to as a URL, link or hyperlink.

According to one preferred embodiment of the method, the user initiates personalization of the identity data of the user based on the application for the electronic identification of the user and the reference to the encrypted identity data.

Preferably, before the transmission of the request to generate the subscription profile, the identity data of the user are collected by the mobile network operator (MNO) or the identification provider and stored on a server of the mobile network operator (MNO) or of the identification provider.

According to one preferred embodiment, the identity data of the user are read from an electronic identification document of the user.

According to one preferred embodiment of the method, the identity data are deleted from the server of the mobile network operator (MNO) or of the identification provider after the transmission of the request to generate the subscription profile.

BRIEF DESCRIPTION OF THE FIGURES

The invention and further embodiments and advantages of the invention are explained in more detail below with reference to figures, wherein the figures merely describe exemplary embodiments of the invention. The same components in the figures are provided with the same reference signs. The figures should not be considered to be true to scale; individual elements of the figures may in particular be illustrated so as to be overly large or overly simplified.

DETAILED DESCRIPTION OF EXEMPLARY EMBODIMENTS

Figure 1:
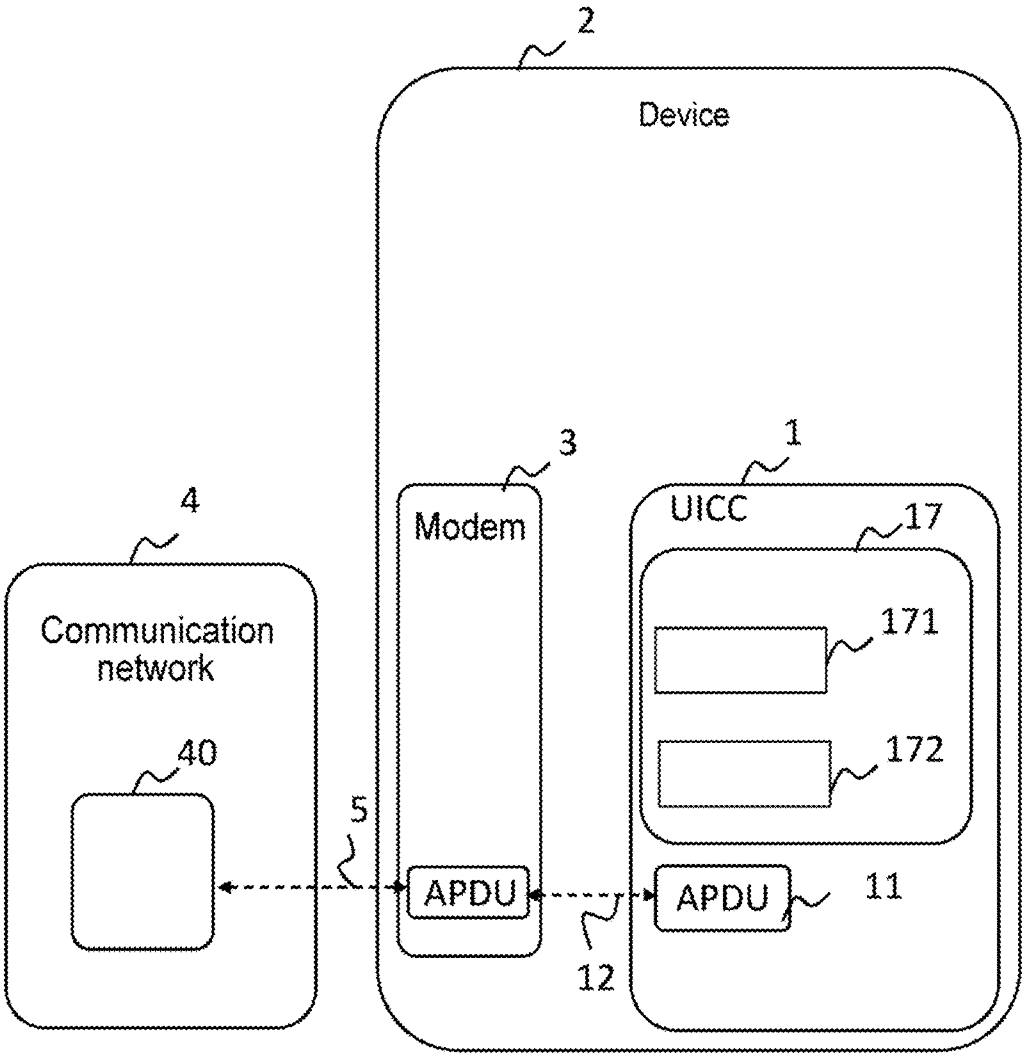
FIG. 1 shows one exemplary embodiment of a system consisting of a mobile network, a terminal and a subscriber identity module.

FIG. 1 shows one exemplary embodiment of a system comprising a mobile network, a terminal 2 and an exemplary subscriber identity module 1 having a memory 17. The memory 17 may store applets, a card application toolkit (CAT), authentication data records 172, an authentication data manager 171 and at least one subscription profile 173*a-c*, in particular a multiplicity of subscription profiles 173*a-c*.

The one or more subscription profiles 173*a-c* of the subscriber identity module 1 are generally installed in an application bundle. The application bundle may be a (virtual) runtime environment, in particular a JavaCard runtime environment, JCRE (in line with the Standard Java Card Classic Edition).

The subscriber identity module 1 may comprise multiple application bundles. These application bundles should be strictly separate from one another according to the GSMA standard and should have applications that are "shielded" from one another. An application bundle may be designed such that it does not expose (uncover) its own elements to another application bundle.

In addition to the subscription profile, the application bundle may also comprise, by way of example, a GSM applet containing a file system and events, a remote file manager, RFM for short, an applet and further applets.

Application bundles may be pre-installed on the subscriber identity module 1 as empty application bundles or be generated dynamically by way of a call via a system programming interface (system API). A system API is preferably understood to be an API of the subscriber identity module 1.

The subscriber identity module 1 is inserted into the terminal 2 ready for operation and is supplied with a supply voltage Vcc and a clock cycle CLK by the terminal 2. The subscriber identity module 1 is illustrated in more detail in FIG. 2. FIG. 1 indicates that the subscriber identity module 1 contains the memory 17. This memory 17 may store applets, the card application toolkit (CAT), authentication data records 172 and the authentication data manager 171. Different APDU commands 11 may be exchanged between the UICC 1 and the terminal 2 using the applets, the CAT and the operating system (not illustrated).

The terminal 2 comprises for example—but not necessarily—a modem 3. The modem 3 may be considered to be a logic unit for converting data between the subscriber identity module 1 and a server 40 of a network 4. The terminal 2 may set up a communication connection 12 to the subscriber identity module 1 via the modem 3. The communication 12 between the terminal 2 and the subscriber identity module 1 takes place in accordance with the protocols defined in the international ISO/IEC 7816-3 and ISO/IEC 7816-4 standards, to which reference is hereby expressly made.

The entire data exchange between the subscriber identity module 1 and the terminal 2 preferably takes place using what are known as APDUs (application protocol data units) according to the ISO/IEC 7816-4 standard. An APDU constitutes a data unit on the application layer, that is to say a kind of container using which commands and/or data are transmitted to the subscriber identity module 1. A distinction is made between command APDUs transmitted from a terminal 2 to the subscriber identity module 1 and response APDUs transmitted from the subscriber identity module 1 to the terminal 2 in response to a command APDU.

The modem 3 is a communication unit of the terminal 2 for also exchanging data of the terminal 2 or of the subscriber identity module 1 with the communication network 4 and the server 40 located therein. The data exchanged between the subscriber identity module 1 and the modem 3 may be converted into an IP-based connection protocol in the modem 3.

Figure 2:
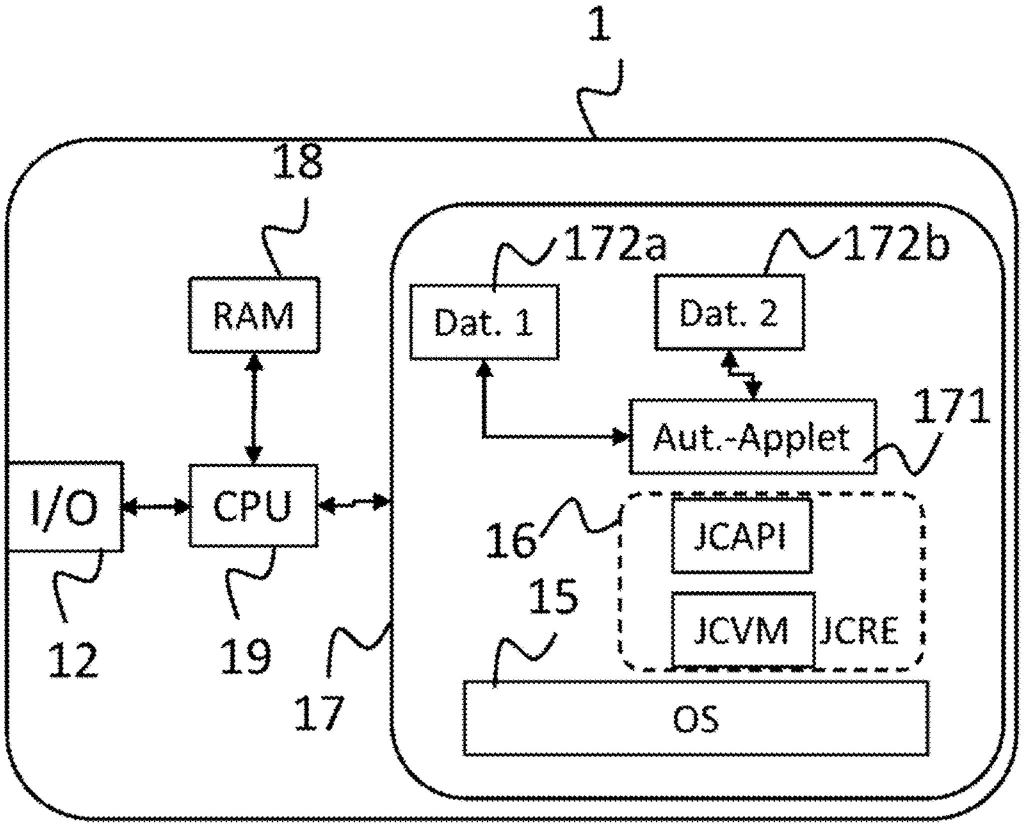
FIG. 2 shows one exemplary embodiment of a subscriber identity module.

FIG. 2 shows a block diagram of one example of a subscriber identity module 1, preferably a hard-wired eUICC. As an alternative, the subscriber identity module 1 is a portable data carrier with a different design. The subscriber identity module 1 has an operating system 15. By way of example, the operating system 15 is a native operating system. It is also conceivable for the operating system 15 to be configured to run a JavaCard runtime environment, JCRE, 16, which is then stored in the memory 17 together with the operating system 17.

Figure 3:
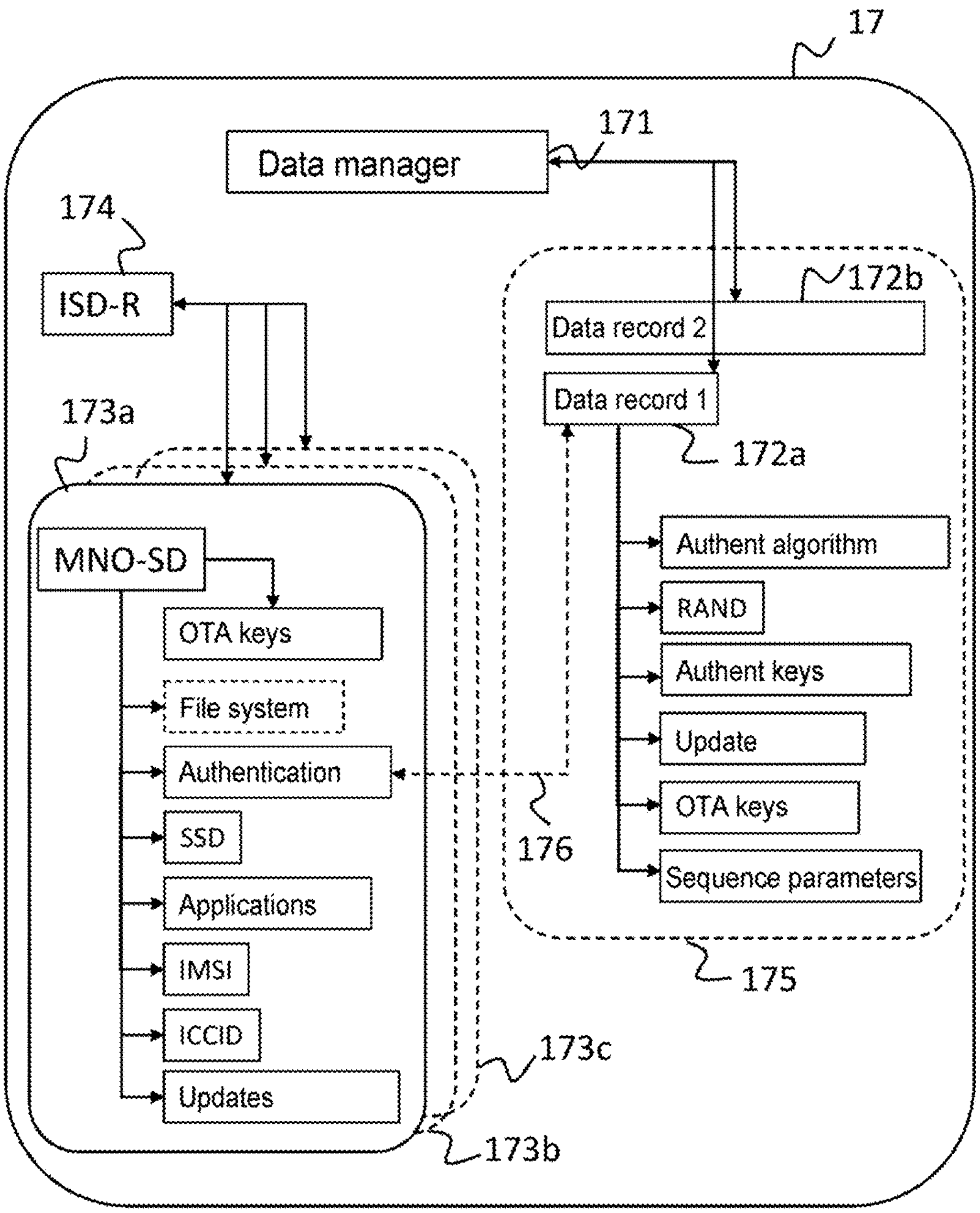
FIG. 3 shows a further exemplary embodiment of a subscriber identity module.

The subscriber identity module 1 is designed to exchange data with the terminal 2 according to FIG. 3. For data transmission and communication between the subscriber identity module 1 and the terminal 2, both the subscriber identity module 1 and the terminal 2 each have suitable communication interfaces 12. The interfaces may be designed for example such that the communication between them or between the subscriber identity module 1 and the terminal 2 are connected galvanically, that is to say with contact. The contact assignment is defined in ISO/IEC 7816. In one embodiment, not illustrated, the communication interface is contactless, for example in accordance with an RFID or NFC or WLAN standard.

The subscriber identity module 1 additionally has a central processor or control unit, CPU 19, which has a communication connection to the interface 12. The primary tasks of the CPU 19 include executing arithmetic and logic functions and reading and writing data elements, as defined by program code executed by the CPU 19. The CPU 19 is also connected to a volatile working memory, RAM 18, and a non-volatile rewritable memory 17. The non-volatile memory 17 is preferably a flash memory (flash EEPROM). By way of example, it may be a flash memory with a NAND or NOR architecture.

In the preferred embodiment illustrated in FIG. 2, the program code is stored in the non-volatile memory 17 and is able to be executed by the CPU 19. In particular, the non-volatile memory 17 may store the program code of the chip card operating system, OS, 15, of the Java Card runtime environment, JCRE, 16 (consisting of Java Card virtual machine, JCVM and Java Card application programming interfaces, JCAPI), of an authentication data management application 13, and at least two authentication data records 172*a*, 172*b*. An application here is preferably present in the form of Java Card™ applets. In addition, a CAT, not shown, according to ETSI TS 102 223 may be included. Instead of an application, provision may also be made for a program element written in native code, for instance in C or in Assembler.

FIG. 3 shows a further exemplary embodiment of a subscriber identity module 1, more precisely of a memory area 17 of a subscriber identity module 1. The memory area 17 is a non-volatile memory, but may also be a volatile memory (RAM). The memory area 17 may be an exclusively assigned memory area 17 that is part of a larger memory unit. The memory area 17 may be a remote memory area. The memory area 17 of the subscriber identity module 1 describes a memory area to which the subscriber identity module 1 or the control unit 19 of the subscriber identity module 1 has exclusive access. The access rights to the memory area 17, that is to say read, write, overwrite, may be defined in a security domain (SD), such that different subunits of the subscriber identity module 1 have or do not have access to different areas of the file system 175.

The memory area 17 of FIG. 3 has for example (but not necessarily) a subscription manager 174 (ISD-R), which is able to manage various subscription profiles 173*a-c*. A subscription profile 173*a-c* may be managed by way of an OTA communication between servers 40 of the communication network, for example subscription servers SM-SR or data provision servers SM-DP, SM-DP+ according to the GSMA specifications SGP.02 and SGP.22, for which purpose for example SMS, CAT_TP or HTTPS is used for the over-the-air, OTA, communication with the subscriber identity module 1. This profile management—which is not part of this description—comprises "creating", "loading", "activating", "deactivating", "deleting" and "updating". Reference may be made to the stated GSMA specifications for details.

A subscription profile 173*a-c* contains profile data. By way of example, one of the following components may be present as a profile file for each subscription profile 173*a-c*: an MNO security domain (MNO-SD) containing the OTA key sets of OTA servers; at least one authentication parameter (Ki, OP, RAND, SGN) or at least one reference 176 (pointer or address) to a corresponding entry 172 in the file system 175 of the subscriber identity module 1; a network access application, policy rules; a profile-specific file system containing DFs, EFs for the respective subscription profile 173*a-c*; a supplementary security domain (SSD for short) for receiving connection parameters of the profile and further keys; an area containing applications, such as applets; a subscriber identifier, IMSI, a subscriber identity module identifier ICCID, and possibly profile updates.

The subscriber identity module 1 furthermore has an authentication data manager 171. This may be stored executably in the memory area 17 of the subscriber identity module 1 in the form of a Java applet (see FIG. 1). The data manager 171 may also be stored executably in the memory area 17 of the subscriber identity module 1 only as native program code. The control unit 19 runs the authentication data manager 171 when required.

The memory 17 of the subscriber identity module 1 furthermore stores authentication data records 172. Two authentication data records 172*a* and 172*b* are illustrated by way of example, but the number is not limited. An authentication data record 172 may comprise various authentication data. This is illustrated by way of example in FIG. 2 with reference to the first authentication data record 172*a*. This contains an authentication algorithm (Milenage, TUAK) having corresponding authentication parameters, one or more authentication keys (CK, IK, Ki), possibly sequence parameters (counter SGN-MS, SGN-HE, other counters) and authentication updates, etc. In addition to those listed, an authentication data record 172 may contain further authentication data. The authentication data are preferably stored in structured form in the file system 175, as indicated in FIG. 3. However, proprietary files may also be created to store the authentication data records 172.

The authentication data records 172 may be associated with a respective subscription profile 173 with a reference 176. For this purpose, in one embodiment of the invention, an area in which the activated authentication data are stored is defined in the file system 175. A subscription profile 173 then accesses this area in order to authenticate the subscriber identity module 1 with the server 40 of the communication network 4.

In another embodiment, the authentication data are written to the respective memory area of the file system afterwards.

Implementation details in this regard are described in detail in technical reports TR 33.834 and TR 133.935, and reference is made herein to the implementations, in particular the update according to solutions 4*b* and 5. If updates are received, then they are stored in a memory area of the UICC with the aid of the authentication data manager 171. To this end, either a new file or a new file structure is created in the file system 175 or a corresponding authentication data record 172 is updated, for example overwritten or extended. In addition, a reference 176 to the authentication data may be updated, for example by updating a memory address, updating a pointer, or copying the updated authentication datum to the appropriate area of the profile. Only one authentication data record is able to be activated at a time, and so the subscriber identity module 1 performs a unique authentication with the communication network.

By way of example, the data records are stored in EF files of the subscriber identity module 1. As an alternative or in addition, the authentication data may be stored in data objects, for example in data objects of the subscriber identity module 1. As an alternative or in addition, the authentication data may be stored in reserved memory areas of the operating system, OS, of the subscriber identity module 1. These different storage locations may possibly require the structure of the data records to be changed.

The data records may therefore be stored in differently structured data records 172*a*, 172*b* according to their storage location. The authentication data manager 171 is in particular configured to restructure and adapt the stored authentication data, in particular the data records 172*a*, 172*b* of the authentication data, in each case accordingly, in order to be able to use them for proper authentication, on the one hand, and to store them at the desired storage location, on the other hand.

Figure 4:
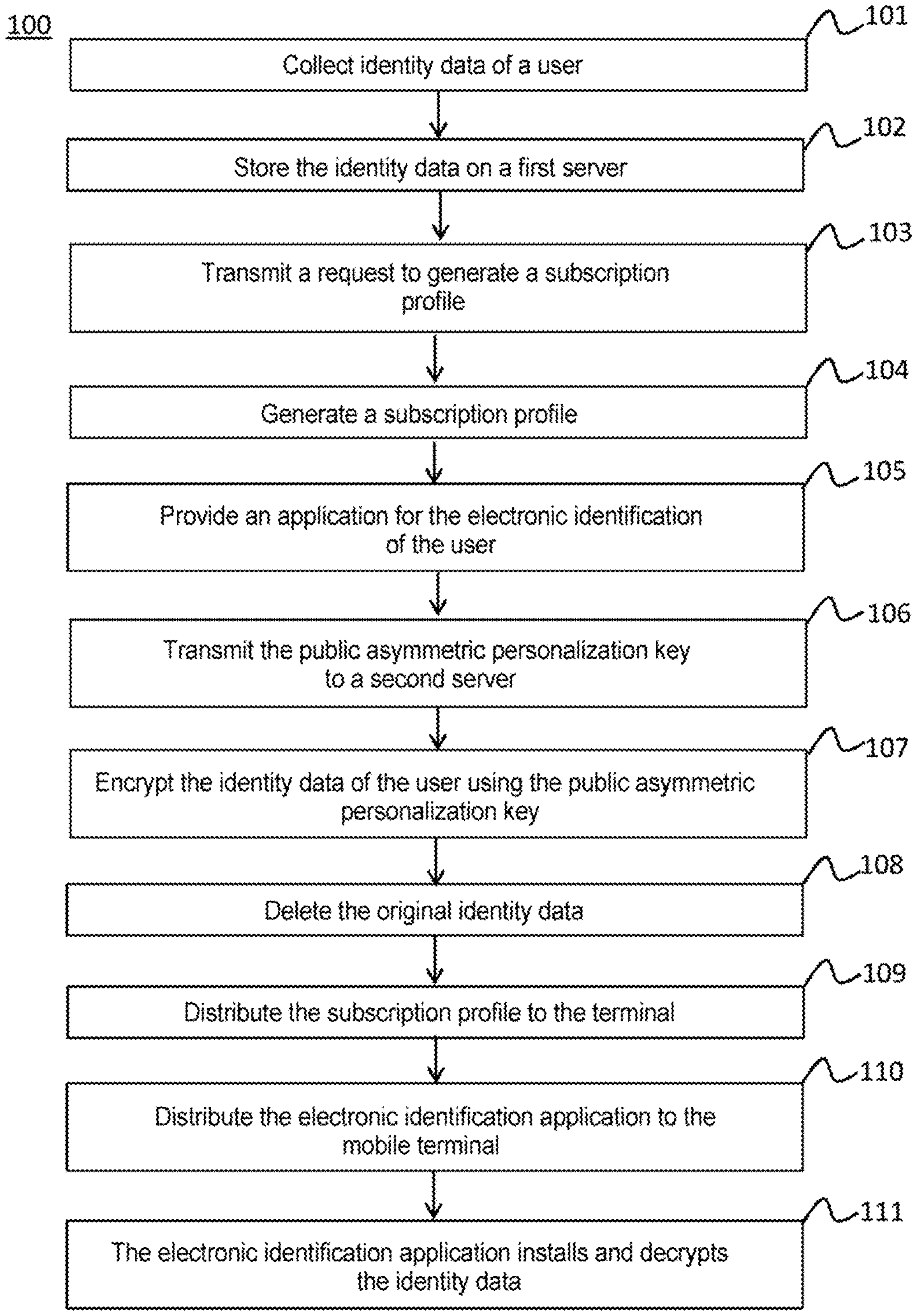
FIG. 4 shows one exemplary embodiment of a flowchart of a method according to the invention.

FIG. 4 shows one exemplary embodiment of a flowchart of a method according to the invention. The method 100 for managing an application for the electronic identification of a user of a mobile terminal 2 having a subscriber identity module 1 in a mobile network according to the exemplary embodiment comprises the following method steps:

- collecting 101 identity data of a user;
- storing 102 the collected identity data of a user on a first server;
- transmitting 103 a request to generate a subscription profile 173*a-c* to a subscription manager data preparation (SM-DP+) server of the mobile network;
- generating 104 a subscription profile 173*a-c*, wherein generating the subscription profile 173*a-c* comprises generating a private asymmetric personalization key associated with the subscription profile 173*a-c* and a public asymmetric personalization key associated with the subscription profile 173*a-c* for an application for the electronic identification of the user;
- a subscription manager data preparation (SM-DP+) server of the mobile network or a trusted service providing 105 an application for the electronic identification of the user;
- transmitting 106 the public asymmetric personalization key to a second server, namely a server of the mobile network operator (MNO) or a server of an identification provider;
- encrypting 107 identity data of the user using the public asymmetric personalization key;
- deleting 108 the collected identity data of a user;
- distributing 109 the subscription profile 173*a-c* with the private asymmetric personalization key to the mobile terminal 2;
- a subscription manager data preparation (SM-DP+) server of the mobile network or a trusted service distributing 110 the application for the electronic identification of the user to the mobile terminal (2);
- installing 111 the identity data in the application for the electronic identification of the user, and the application for the electronic identification of the user decrypting said identity data.

The subscription manager data preparation (SM-DP+) server is generally a server that is part of the mobile network and communicates with other entities of the mobile network. The subscription manager data preparation (SM-DP+) server generally prepares subscription profiles 173*a-c*, secures them with a profile protection key, securely stores profile protection keys and the protected subscription profiles 173*a-c* in a profile package repository, and associates the protected profile packages with specific identifiers of the subscriber identity module 1 (EIDs).

The SM-DP+ server generally links protected subscription profiles 173*a-c* to the respective EID and securely downloads these linked profile packages onto the LPA of the respective subscriber identity module 1 (eUICC).

The subscription manager data preparation (SM-DP+) server may in particular be a subscription manager data preparation (SM-DP+) server according to the GSM specification SGP.22, in particular according to Version 2.3 of the GSM specification SGP.22 of 30 Jun. 2021.

The generated public and corresponding private asymmetric personalization keys are expediently stored in the supplementary security domain (SSD) of the subscription profile 173*a*-*c*. The generation of the public asymmetric personalization key and of a corresponding private asymmetric personalization key is generally based on an asymmetric cryptosystem, in particular a public key encryption method.

The application for the electronic identification of the user may for example be an electronic identification applet (eID applet) that is able to be executed in particular on the terminal 2 of the user. The electronic identification applet may be linked to or be part of the subscription profile 173*a*-*c* or be part of an application bundle of the subscription profile 173*a*-*c*.

The electronic identification application may be generated or provided by the subscription manager data preparation (SM-DP+) server or a trusted service, for instance a trusted service manager (TSM). If provision is carried out by a trusted service, subscription manager data preparation (SM-DP+) server and the trusted service expediently exchange master keys or certificates prior to distribution of an electronic identification application. The trusted service thereafter expediently has available a key or credential, using which the trusted service is able to identify itself to a subscription profile 173*a*-*c*. By way of example, the trusted service may receive a key that corresponds uniquely to a key stored in the supplementary security domain (SSD) of the subscription profile 173*a*-*c*.

Preferably, the electronic identification application is written to the application area of the subscription profile 173*a*-*c*.

The terminal 2 may in particular be a mobile telephone of the user.

Encrypting 107 the identity data of the user by way of the public asymmetric personalization key makes it possible to ensure that the identity data are able to be installed only in the exact application for the electronic identification of the user that belongs to the subscription profile 173*a*-*c* provided for the user, since only this is able to decrypt the encrypted identity data. The method 100 complies with the current data protection regulations, in particular the General Data Protection Regulation (GDPR).

Preferably, the public asymmetric personalization key and the private asymmetric personalization key are generated 104 by way of a hardware security module.

According to one preferred embodiment of the method 100, before the transmission 103 of the request to generate the subscription profile 173*a*-*c*, the identity data of the user are collected 101 by the mobile network operator (MNO) or the identification provider and stored 102 on a first server, namely a server of the mobile network operator (MNO) or of the identification provider. The identity data of the user may in this case be read from an electronic identification document of the user, such as for example an electronic passport or identity card. Such an electronic identification document is generally provided with a readable chip and may be present as what is known as a smart card. Reading the electronic identification document of the user makes it possible to ensure high accuracy of the identity data obtained.

The user may be identified for example by the mobile network operator when entering into a mobile phone contract for the user. When entering into a mobile phone contract for the user, the identity data of the user have to be collected in any case. As an alternative, the mobile network operator may also commission an identification service and/or use the services thereof to identify the user.

The public asymmetric personalization key and the private asymmetric personalization key may be generated 104 by way of a hardware security module.

After encryption 107 of the identity data of the user, the encrypted identity data may be stored on a server, for instance on the second server.

After storage of the encrypted identity data on the second server, the originally collected identity data may be deleted 104.

The encrypted identity data are able to be decrypted by way of an electronic identification application introduced into a subscription profile 173*a*-*c*, which comprises the corresponding private asymmetric personalization key. Preferably, the encrypted identity data are able to be decrypted only by a subscription profile 173*a*-*c* that comprises the application for the electronic identification of the user.

A reference to the encrypted identity data, in particular to the encrypted identity data stored on the server, may be transmitted to the user in the form of a URL or a QR code. Such a reference may also be referred to as a link, hyperlink or URL.

The user may initiate personalization of their identity data based on the application for the electronic identification of the user and the reference to the encrypted identity data. The application allows the user to supplement their identity data or correct them in the event of errors.

Based on the method 100, mobile network operators, in particular operators of a subscription manager data preparation (SM-DP+) server, are given the ability to generate such an application (eID applet) and distribute it to the terminals 2 of the users. The application may then be personalized by the user.

The subscriber identity module 1 may comprise a register. This register may store data by way of which all entities are able to be referenced uniquely. These data comprise an identifier of the corresponding application bundle and an identifier of the corresponding subscription profile 173*a*-*c* (according to ISO/IEC 7816). According to this embodiment, proceeding from the active application bundle, it is possible to filter out the entities that correspond to the identifier of the active application bundle and the subscription manager 174. Moreover, it is possible to create a non-UICC application bundle that has the same interface but is not managed by the subscription manager 174.

Within the scope of the invention, all of the elements described and/or shown and/or claimed may be combined with one another as desired.

The invention claimed is:

1. A method for managing an application for an electronic identification of a user of a mobile terminal having a subscriber identity module in a mobile network, comprising the following method steps:

transmitting a request to generate a subscription profile to a subscription manager data preparation server of the mobile network;

generating the subscription profile, wherein generating the subscription profile comprises generating, remote from the mobile terminal, a private asymmetric personalization key associated with the subscription profile and a public asymmetric personalization key associated with the subscription profile for the application for the electronic identification of the user;

transmitting the public asymmetric personalization key to a server of a mobile network operator of the mobile network or to a server of an identification provider;
encrypting identity data of the user using the public asymmetric personalization key;
distributing the subscription profile with the private asymmetric personalization key to the mobile terminal; and
distributing, by the subscription manager data preparation server of the mobile network or a trusted service the application for the electronic identification of the user to the mobile terminal, wherein the application is configured to decrypt the identity data using the private asymmetric personalization key.

2. The method as claimed in claim 1, wherein a reference to the encrypted identity data, in particular to the encrypted identity data stored on the server, is transmitted to the user in the form of a URL or a QR code.

3. The method as claimed in claim 2, wherein the user initiates personalization of the identity data of the user based on the application for the electronic identification of the user and the reference to the encrypted identity data.

4. The method as claimed in claim 1, wherein, before transmitting the request to generate the subscription profile, the identity data of the user are collected by the mobile network operator or the identification provider and stored on a server of the mobile network operator or of the identification provider.

5. The method as claimed in claim 4, wherein the identity data of the user are read from an electronic identification document of the user.

6. The method as claimed in claim 4, wherein the identity data are deleted after encryption and storage on a server.

7. The method as claimed in claim 1, wherein the encrypted identity data of the user are installed in the application for the electronic identification of the user and decrypted by said application.

8. The method as claimed in claim 1, wherein the trusted service exchanges master keys or certificates with the subscription manager data preparation server of the mobile network.

9. The method as claimed in claim 1, wherein the public asymmetric personalization key and the private asymmetric personalization key are generated by way of a hardware security module.

10. The method as claimed in claim 1, wherein, after encrypting the identity data of the user, the encrypted identity data are stored on a server.

11. The method as claimed in claim 1, wherein the subscription profile comprises the application for the electronic identification of the user of the mobile terminal.

12. A system for managing an application for an electronic identification of a user of a mobile terminal comprising:
a subscription manager data preparation server;
a mobile network comprising a server of a mobile network operator; and
a mobile terminal comprising a subscriber identity module;
wherein the subscription manager data preparation server is configured to:
generate a subscription profile by generating, remote from the mobile terminal, a private asymmetric personalization key associated with the subscription profile and a public asymmetric personalization key associated with the subscription profile for the application for the electronic identification of the user;
transmit the public asymmetric personalization key to the server of the mobile network operator or to a server of an identification provider;
distribute the subscription profile with the private asymmetric personalization key to the mobile terminal; and
distribute the application for the electronic identification of the user to the mobile terminal;
wherein the server of the mobile network operator is configured to encrypt identity data of the user using the public asymmetric personalization key, and wherein the application is configured to decrypt the identity data using the private asymmetric personalization key.

13. The system as claimed in claim 12, wherein the server of the mobile network operator is further configured to transmit a reference to the encrypted identity data, in particular to the encrypted identity data stored on the server, to the user in the form of a URL or a QR code.

* * * * *